United States Patent Office 3,563,945
Patented Feb. 16, 1971

3,563,945
ENZYME STABILIZED POLYVINYLIDENE
CHLORIDE LATEX
Donald L. Johnson, Thomas F. Protzman, and Jerrel L.
Zimmerman, Decatur, Ill., assignors to A. E. Staley
Manufacturing Company, Decatur, Ill., a corporation
of Delaware
No Drawing. Filed Apr. 10, 1968, Ser. No. 720,382
Int. Cl. C08f 45/24; C09d 5/02
U.S. Cl. 260—29.6
11 Claims

ABSTRACT OF THE DISCLOSURE

A non-corrosive, stable polyvinylidene chloride latex is produced by adding corrosion inhibiting amounts of a peroxide destroying enzyme such as a peroxidase or catalase to a polyvinylidene chloride latex containing residual peroxides. The stabilized composition has particular utility as a coating for cellulosic substrates.

---

This invention relates to a non-corrosive polyvinylidene chloride latex composition suitable for use in coating cellulosic fibers. More particularly, this invention relates to a method for rendering a polyvinylidene chloride latex emulsion containing residual peroxides substantially noncorrosive to metals without altering the polymer's heat sealing temperature.

Polyvinylidene chloride polymers, and particularly their copolymers, have been found to be particularly useful as coatings for paper, metals, plastics, etc. primarily because, after drying, they form protective coatings which are tough, flexible, transparent, heat sealable and generally moisture resistant. In addition, these coatings are substantially inert to a large number of materials such as water, acids, organic oils, fats, etc. and are relatively impermeable to many gases such as oxygen. The polyvinylidene chloride polymer can be coated on the substrate in the form of a latex or aqueous dispersion rather than as a solution in an organic solvent. This method not only avoids the use of expensive organic solvents but also reduces the need for extensive safety precautions when inflammable or toxic organic solvents are employed. It was found, however, that the application of polyvinylidene chloride latex as a coating to paper, for example, corroded and pitted the metal rolls used in the application process. In addition, small button-like accumulations of polymer were found to build up along the surfaces of the roll destroying the roll's smooth surface.

Although the reason for this corrosive action was not fully understod, it was believed that it could be overcome if the acidic nature of the latex was neutralized by the addition of a basic material. It was found that the corrosion by the neutralized latex emulsion was inhibited by the addition of a basic material; however, the neutralized latex emulsion became unstable and could not be stored for extended periods of time. This instability is attributed to the delicate balance of conditions and ingredients which is required to maintain the latex polymer in the amorphous state prior to coating on a paper substrate.

In U.S. Pat. 2,744,080, a method is disclosed for rendering aqueous dispersions of polyvinylidene chloride noncorrosive to metal plates at 100° C. by the addition of small amounts of hydrogen peroxide. However, it was found that, in the present system, the corrosive action exhibited by the emulsion or dispersion itself was not overcome by the addition of peroxides. Instead, it was found that the corrosive action of the emulsion or dispersion could be inhibited only if the residual peroxides were destroyed or neutralized.

It is, therefore, an object of this invention to provide a polyvinylidene chloride latex which exhibits non-corrosive properties towards metals without losing its stable properties. Another object of this invention is to prevent corrosion of metal surfaces when a polyvinylidene chloride latex is brought in contact with metal surfaces. Another object of this invention is to provide a means for destroying or deactivating peroxides in polyvinylidene chloride latexes.

These and other objects of this invention are accomplished by treating a polyvinylidene chloride latex containing residual peroxides with corrosion inhibiting quantities of peroxide destroying enzyme. Although any enzymatic material capable of destroying or deactivating peroxides may be used, the heme (sometimes referred to as hematin) enzymes, that is, enzymes which contain heme such as the peroxidases and particularly catalases which are capable of destroying or deactivating peroxides at a pH of below 5.5, are preferred. The heme enzymes interact with peroxides such as hydrogen peroxide to either transfer oxygen to a substrate to be oxidized (peroxidase) or reduced hydrogen peroxide to water and oxygen (catalase). Peroxidases can be obtained with relative ease from plant and animal tissue or from microbes. Crystalline peroxidases can be obtained from horseradish root and milk (lactoperoxidase) and highly purified preparations from leucocytes (verdoperoxidase of myeloperoxidase), yeast and fig sap. One of the best known peroxidases is horseradish peroxidase.

Catalases represent specific types of heme containing hydroperoxidases and, like peroxidases, can be obtained from plants, animals or microbes. Mammalian catalase, such as beef liver catalase, and fungal catalase, such as Aspergillus catalase and Penicillium catalase, to name just a few, are all capable of destroying or deactivating peroxides. However, certain strains of Aspergillus and Penicillium, and particularly those strains which can be effectively used at a pH of below 5.5, are preferred. Such catalases are generally classified as fungal catalases. Examples of suitable fungal catalases which can be used include those derived from Aspergilli, such as *Aspergillus niger* and *Aspergillus oryzae*. A particularly suitable fungal catalase which can be used in this invention is commercially available from Fermco Laboratories (a division of C. D. Searle & Co.), Chicago, Ill., under the trade name Fermcolase.

The action of the heme enzymes on the residual peroxides present in the polyvinylidene latex polymer substrate is most pronounced when the substrate is maintained at a pH of less than 5.5 and at a temperature below that which will deactivate the catalase enzyme (e.g. 35° C. in a polyvinylidene polymer latex) when the enzyme is added and preferably is maintained at a pH of between 4.0 and 5.0 and at a temperature of between 15 and 30° C.

At a pH of greater than 5.5 there is a tendency for the polyvinylidene chloride latex polymer to take on a yellowish color, which in most cases is undesirable, while at temperatures above 35° C. a noticeable reduction in enzyme activity occurs. The amount of enzyme used is not particularly critical and can be varied over a broad range. However, an amount of between about 2.5 to 12 Baker Units [1] is, for economic reasons, generally preferred. When about 2.5 to 12 Baker units are used, a contact time of generally between about 5 to 15 minutes is normally required to destroy or deactivate substantially all of the residual peroxides present in the latex polymer substrate.

One of the advantages of this invention is that the addition of a peroxide destroying enzyme does not con-

---

[1] Method of assay described in D. Scott, F. E. Hammer, Assay of Commercial Catalase Enzymol. 22, 194 (1960).

comitantly increase the polyvinylidene chloride latex's heat sealing temperature. This means that a heat sealing temperature of, for example, 240° F. will remain the same even after the latex polymer has been stabilized by the addition of the enzyme. This result can be highly advantageous particularly since the addition of an inorganic salt type corrosion inhibitor such as an alkali metal salt will, in most cases, increase the heat sealing temperature by as much as 40 to 70° F. However, in instances where it is desirable to have and to maintain a relatively low heat sealing temperature it is necessary to add a corrosion inhibiting agent which will effectively inhibit corrosion yet will not increase the latex's heat sealing temperature. This is readily accomplished by the instant invention.

The peroxide destroying enzyme can be used with aqueous dispersions or latex compositions of any polymer or copolymer of vinylidene chloride. If the stabilized copolymer latex composition is to be used as a coating of, for example, paper, the copolymer latex composition will contain from about 70–97% by weight vinylidene chloride, and preferably, from about 85 to 94% by weight vinylidene chloride. The use of copolymers is of special value in paper coating operations such as on paper, metal foil, plastic film and especially where premature crystallization of the polymer is to be avoided. Examples of suitable monoethylenically unsaturated comonomers which can be copolymerized with vinylidene chloride and which can be stabilized against corrosion by the addition of a peroxide destroying enzyme include alkyl esters of alpha, beta-ethylenically unsaturated monocarboxylic acids containing from 1 to 18 carbon atoms in the alkyl group; such as methyl acrylate, ethyl acrylate, 2-ethylhexyl acrylate, methyl methacrylate, and ethyl alphacyanoacrylate, etc.; alpha, beta-ethylenically unsaturated acids, such as acrylic acid, methacrylic acid and itaconic acid; alpha, beta-ethylenically unsaturated nitriles, such as acrylonitrile, methacrylonitrile and ethacrylonitrile; alpha, beta-ethylenically unsaturated amides, such as methacrylamide and acrylamide; monovinyl aromatics, such as styrene and vinyl toluene; vinyl halides, such as vinyl chloride and vinyl bromide; diesters of alpha, beta-ethylenically unsaturated dicarboxylic acids, such as dimethyl itaconate, diethyl fumarate and dimethyl maleate; alkyl vinyl ethers, such as methyl vinyl ether and ethyl vinyl ether; alkyl vinyl ketones, such as methyl vinyl ketone, etc. If desired, up to about 2% by weight of the monomers used can be copolymerizable di(ethylenically unsaturated) comonomers, such as allyl crotonate, allyl acrylate, polyhydric alcohol esters of alpha, beta-ethylenically unsaturated monocarboxylic acids, such as 1,3-butylene dimethacrylate, the diacrylate or dimethacrylate of glycol, diethylene glycol, triethylene glycol, etc.

As an emulsion or aqueous dispersion, the polyvinylidene chloride polymer is dispersed in water by means of dispersing or emulsifying agents, such as the anionic and nonionic surface active agents. For most dispersing operations, a combination of anionic and nonionic surface active agents is employed. Suitable anionic surface active agents include alkali metal salts of alkyl aryl sulfonates, such as sodium dodecyl benzene sulfonate, and alkali metal salts of alkyl sulfates, such as sodium lauryl sulfate. Suitable nonionic surface active agents include the alkylphenyl polyoxyethylene glycols and alkylpolyoxyethylene glycols containing from 4 to 18 carbon atoms in the alkyl group and from about 2 to 120 oxyethylene units. These compounds can be used in a weight concentration of about 0.1 to 6% of the total monomer weight with about 0.5 to 3% being best. The most advantageous concentration will depend, as in all emulsion polymerizations, in part on the emulsifier or emulsifiers used, the monomers to be polymerized, the desired particle size, the initiator system, etc.

The polymerization reaction is catalyzed by the use of any peroxidic free radical type catalyst. Suitable catalysts include inorganic or organic peroxides and hydroperoxides such as hydrogen peroxide, benzoyl peroxide, tertiary butyl hydroperoxide, diisopropyl benzene hydroperoxide, cumene hydroperoxide, caproyl peroxide, methylethyl ketone peroxide, and the like.

Frequently the polyvinylidene chloride latex will contain catalyst promoters for hastening the polymerization reaction, particularly at lower temperature, and also to avoid coagulation. Examples of suitable promoters include ascorbic acid, soluble sulfites, hydrosulfites, sulfoxalates, thiosulfates and bisulfites. Certain polyvalent ions such as ferrous ions can also be used if desired. The amount of promoter used is in a sense quite critical since large amounts of promoter, e.g. an amount greater than one mol per mol of catalyst, result in a polymerization reaction which is sluggish and generally unsatisfactory. For optimum polymerization a catalyst to promoter mol ratio of about 2:1 is used. If the amount of peroxidic catalyst varies more than 15–25% from this preferred 2:1 mol ratio, the polymerization reaction is not only economically unfavorable but is generally unsatisfactory from a process standpoint. Under these optimum polymerization conditions, a residual amount of the peroxidic catalyst will, unless removed or neutralized, be found in the aqueous dispersions of the vinylidene chloride polymers thereby produced. Such dispersions or emulsions are, as earlier pointed out, generally unsuitable for use in paper coating operations because of their corrosive action on metal surfaces.

If desired, a preferred latex polymer (seed latex) can also be added to the polymerization system for forming polymers having particle size within certain desired ranges. The use of seed latexes is described in greater detail in copending patent application Ser. No. 563,703 filed July 8, 1966.

The polymerization is best effected at temperatures below about 95° C. The preferred range is about 30° to 70° C. with the lower portion of the range (30–45° C.) being preferred to initiate the polymerization. Slightly lower temperatures, down to 0° C., are permissible, but usually impractical. After most of the monomers have been converted to polymer, temperatures even higher than 95° C. may be employed. During polymerization the temperature can be controlled in part by the rate at which monomers are supplied and polymerized and/or by applied cooling.

The polymerization can be carried out batchwise, if desired, by the continuous addition of one or more other components employed in the polymerization.

If a more detailed description covering the production of polyvinylidene chloride emulsions or aqueous dispersions and their use in paper coating operations is desired, such additional information can be found in U.S. Pats. 2,909,449 and 3,328,330 and in copending patent application of Smith and Peterson, Ser. No. 563,703 filed July 8, 1966.

The following examples are merely illustrative and should not be construed as limiting the scope of the invention.

EXAMPLE 1

The following premixtures were prepared to be used in the preparation of a polyvinylidene chloride latex.

| Emulsifier-monomer premixture: | Parts (wet wt.) |
|---|---|
| Vinylidene chloride | 2094.5 |
| Methyl acrylate | 195.6 |
| Acrylic acid | 11.5 |
| 1,3-butylene dimethacrylate | 11.5 |
| Seed latex (20% dry solids) | 230.2 |
| Sodium dodecylbenzene sulfonate (23% dry solids) | 167.8 |
| Sodium lauryl sulfate (29% dry solids) | 23.1 |
| Disodium monodecylphenoxybenzene disulfonate (45% dry solids basis) | 14.9 |
| Water | 302.5 |

Reactor charge:

| | |
|---|---|
| $NaH_2PO_4 \cdot H_2O$ | 6.0 |
| Citric acid·$H_2O$ | 0.46 |
| Water | 312.9 |
| Seed latex (20% dry solids) | 109.8 |
| 2% by weight $H_2O_2$ | 100.0 |
| Vinylidene chloride | 89.5 |
| Methyl acrylate | 8.4 |
| Acrylic acid | 0.5 |
| 1,3-butylene dimethacrylate | 0.5 |
| Sodium dodecylbenzene sulfonate (23% dry solids) | 7.2 |
| Sodium lauryl sulfate (29% dry solids) | 1.0 |
| Disodium monodecylphenoxybenzene disulfonate (45% dry solids) | 0.6 |

Initiating system:

| | |
|---|---|
| Ascorbic acid (0.8% dry solids) | 300.0 |
| 2% by weight hydrogen peroxide | 120 |

A water-cooled stainless steel glass lined reactor was charged with the above described charge. After the temperature was adjusted to 30° C., promoter (ascorbic acid) was added to the reactor at a rate of about one-half part per minute. After about 15 minutes, the addition of emulsifier-monomer premixture was started at a rate of about one-half part per minute. The temperature was maintained at between about 35–45° C. by cooling and adjusting the rate of addition of the monomer-emulsifier premixture, promoter and additional catalyst. After the monomer-emulsifier premixture addition was complete (about five hours), the reaction temperature was raised to 70° C. to complete the polymerization. The cooled 60% solids composition was post-stabilized with 35 parts by weight of sodium dodecylbenzene sulfonate (23% dry solids) and had a Brookfield viscosity at 77° F. (Model RVT, 20 r.p.m., #2 spindle) of 34 cps.

The seed latex used in this example, which contained particles principally in the range of 0.01 to 0.05 micron, was prepared by charging a water-cooled stainless steel reactor with 0.2 part by weight $NaH_2PO_4 \cdot H_2O$, 640 parts by weight water, 20 parts by weight 2% $H_2O_2$ and 60 parts by weight of an emulsifier composition composed of 56.0 parts by weight of sodium dodecylbenzene sulfonate (23% dry solids), 5.5 parts by weight sodium lauryl sulfate (29% dry solids), 3.5 parts by weight disodium monodecylphenoxybenzene disulfonate (45% dry solids) and 15 parts by weight water. After the temperature was adjusted to 35° C., 280 parts by weight of an emulsified monomer composition containing 180 parts by weight vinylidene chloride, 18 parts by weight methyl acrylate, 2 parts by weight methacrylic acid and the remaining 20 parts by weight of the above described emulsifier composition was added to the reactor at the rate of about 3 parts by weight per minute. At the same time 40 parts by weight of ascorbic acid (0.8% by weight dry solids) was added over a period of about 2 hours while maintaining the reactor at between 35 to 45° C.

EXAMPLES 2–10

These examples show that corrosion of metals can be inhibited by subjecting the polyvinylidene latex polymer to the action of an enzyme exhibiting catalase activity.

To a series of 100 gm. portions of the polyvinylidene latex polymer prepared in Example 1, 2.5, 4.0 or 9 units of fungal catalase (Fermcolase) were added. The corrosion-suppressing activity of the enzymes was determined as a function of pH and temperature by placing various metal strips into the treated latex polymer and allowing the strips to remain in the latex polymer for periods of 16 hours after which they were examined for pitting and corrosion. The conditions of testing and the results of the testing are reported in Table I below.

TABLE I

| Ex. | Temp., °C. | pH | Catalase units added/100 grams of latex | Effect on metal strips |
|---|---|---|---|---|
| 2 | 30 | 2.9 | 9.2 | No corrosion detected on aluminum, soft iron, stainless steel. |
| 3 | 30 | 4.6 | 9.2 | Do. |
| 4 | 20 | 4.3 | 9.2 | Do. |
| 5 | 25 | 4.5 | 3.8 | Do. |
| 6 | 25 | 4.5 | 2.5 | Do. |
| 7 | 40 | 4.5 | 2.5 | Some corrosion detected after 16 hours' exposure. |
| 8 | 10 | 4.5 | 2.5 | No corrosion detected on aluminum, soft iron, stainless steel. |
| 9 | 10 | 4.0 | 2.5 | Do. |
| 10 | 10 | 3.0 | 2.5 | Some corrosin detected after 16 hours. |

Since many embodiments of this invention may be made and since many changes may be made in the embodiments described, the foregoing is to be interpreted as illustrative only and the invention is defined by the claims appended hereafter.

What is claimed is:

1. A stabilized essentially non-corrosive polyvinylidene chloride latex composition obtained from a low temperature reaction of a polyvinylidene chloride latex containing residual peroxides and a reducing enzyme selected from the group consisting of peroxidases, lactoperoxidase, verdoperoxidase, myeloperoxidase, catalases, beef liver catalase, and fungal catalase which are capable of neutralizing or deactivating said residual peroxides, said polyvinylidene chloride latex composition having a heat sealing temperature not substantially greater than the heat sealing temperature of the polyvinylidene chloride latex constituent.

2. The composition of claim 1 in which the enzyme is a fungal catalase at a pH of less than 5.5 and the low temperature reaction is below that temperature which would cause deactivation of the catalase enzyme, and the heat sealing temperature is not more than about 240° F.

3. The composition of claim 1 wherein the polyvinylidene chloride latex composition contains from 70–97% vinylidene chloride and from 3–30% of dissimilar copolymerizable ethylenically unsaturated comonomer.

4. The composition of claim 3 wherein the ethylenically unsaturated comonomer is a compound selected from the group consisting of alkyl esters of alpha, beta-ethylenically unsaturated monocarboxylic acid containing from 1 to 18 carbon atoms in the alkyl group; alpha, beta-ethylenically unsaturated acids; alpha, beta-ethylenically unsaturated nitriles; alpha, beta-ethylenically unsaturated amides; vinyl halides; diesters of alpha, beta-ethylenically unsaturated dicarboxylic acids; and alkyl vinyl ketones.

5. A process for rendering a polyvinylidene chloride latex emulsion containing residual peroxides substantially non-corrosive to metals comprising subjecting said latex polymer to effective quantities of a reducing enzyme selected from the group consisting of peroxidases, lactoperoxidase, verdoperoxidase, myeloperoxidase, catalases, beef liver catalase, and fungal catalase which are capable of neutralizing or deactivating said residual peroxides while maintaining the reaction temperature of the mixture sufficiently low to avoid increasing the final heat sealing temperature above the original heat sealing temperature of the polyvinylidene chloride latex emulsion.

6. The process of claim 5 wherein the enzyme is a catalase which is added to a polyvinylidene chloride latex maintained at a pH of less than 5.5 and a temperature below that which would cause deactivation of the catalase enzyme.

7. The process of claim 6 wherein the enzyme is derived from *Aspergillus niger*.

8. The composition of claim 1 wherein the residual peroxides comprise hydrogen peroxide.

9. The process for rendering a polyvinylidene chloride latex emulsion prepared with a hydrogen peroxide catalyst substantially non-corrosive to metals comprising treating said latex with corrosion inhibiting quantities of a reducing agent which is capable of neutralizing or deactivating residual hydrogen peroxide, said emulsion having a heat sealing temperature no greater than the polyvinylidene chloride latex constituent prior to reaction with the reducing agent.

10. The composition of claim 6 wherein the ethylenically unsaturated comonomer is at least one compound selected from the group consisting of methyl acrylate, ethyl acrylate, 2-ethylhexyl acrylate, methyl methacrylate, and ethyl alpha-cyanoacrylate; acrylic acid, methacrylic acid and itaconic acid; acrylonitrile, methacrylonitrile and ethacrylonitrile; methacrylamide and acrylamide; styrene and vinyl toluene; vinyl chloride and vinyl bromide; dimethyl itaconate, diethyl fumarate and dimethyl maleate; methyl vinyl ether and ethyl vinyl ether; methyl vinyl ketone.

11. The composition of claim 10, in which up to 2% by weight of the monomers are copolymerizable di(ethylenically unsaturated) comonomers selected from the group consisting of allyl crotonate, allyl acrylate, polyhydric alcohol esters of alpha, beta-ethylenically unsaturated monocarboxylic acids, including 1,3-butylene dimethacrylate, the diacrylate or dimethacrylate of glycol, diethylene glycol, triethylene glycol.

References Cited

UNITED STATES PATENTS

| 2,687,384 | 8/1954 | Weisberg | 260—29.6EM |
| 2,744,080 | 5/1956 | Brant | 260—29.6EM |
| 2,909,449 | 10/1959 | Banigan | 260—29.6EM |
| 3,261,798 | 7/1966 | Farley | 260—29.6Z |
| 3,297,613 | 1/1967 | Gibbs | 260—72 |

OTHER REFERENCES

"Organic Chemistry," 3rd ed. by Fieser & Freser, pp. 460–468, 1956, Reinhold Pub. Co., New York.

JAY H. WOO, Primary Examiner

UNITED STATES PATENT OFFICE
CERTIFICATE OF CORRECTION

Patent No. 3,563,945    Dated Feb. 16, 1971

Inventor(s) Donald L. Johnson, Thomas F. Protzman and Jerrel L. Zimmern

It is certified that error appears in the above-identified patent and that said Letters Patent are hereby corrected as shown below:

Column 2, line 22, for "reduced" read ---reduce---
Column 2, line 27, for "of" read ---or---
Column 6, Example 2, for "pH 2.9" read ---pH 4.9---
Column 6, Table I, left hand column of table, entry below "3" read ---4--

Signed and sealed this 30th day of November 1971.

(SEAL)
Attest:

EDWARD M. FLETCHER, JR.
Attesting Officer

ROBERT GOTTSCHALK
Acting Commissioner of Patei